Oct. 11, 1960 H. C. GOODRICH 2,956,118

SELECTIVE AMPLITUDE DISCRIMINATORY CIRCUIT

Filed Nov. 30, 1954 2 Sheets-Sheet 1

INVENTOR.
HUNTER C. GOODRICH
BY H. L. Newton
ATTORNEY

SELECTIVE AMPLITUDE DISCRIMINATORY CIRCUIT

Filed Nov. 30, 1954 2 Sheets-Sheet 2

INVENTOR.
HUNTER C. GOODRICH
BY
ATTORNEY

United States Patent Office 2,956,118

Patented Oct. 11, 1960

2,956,118

SELECTIVE AMPLITUDE DISCRIMINATORY CIRCUIT

Hunter C. Goodrich, Collingswood, N.J., assignor to Radio Corporation of America, a corporation of Delaware Filed Nov. 30, 1954, Ser. No. 472,105

3 Claims. (Cl. 178—7.3)

Figures 1, 2:
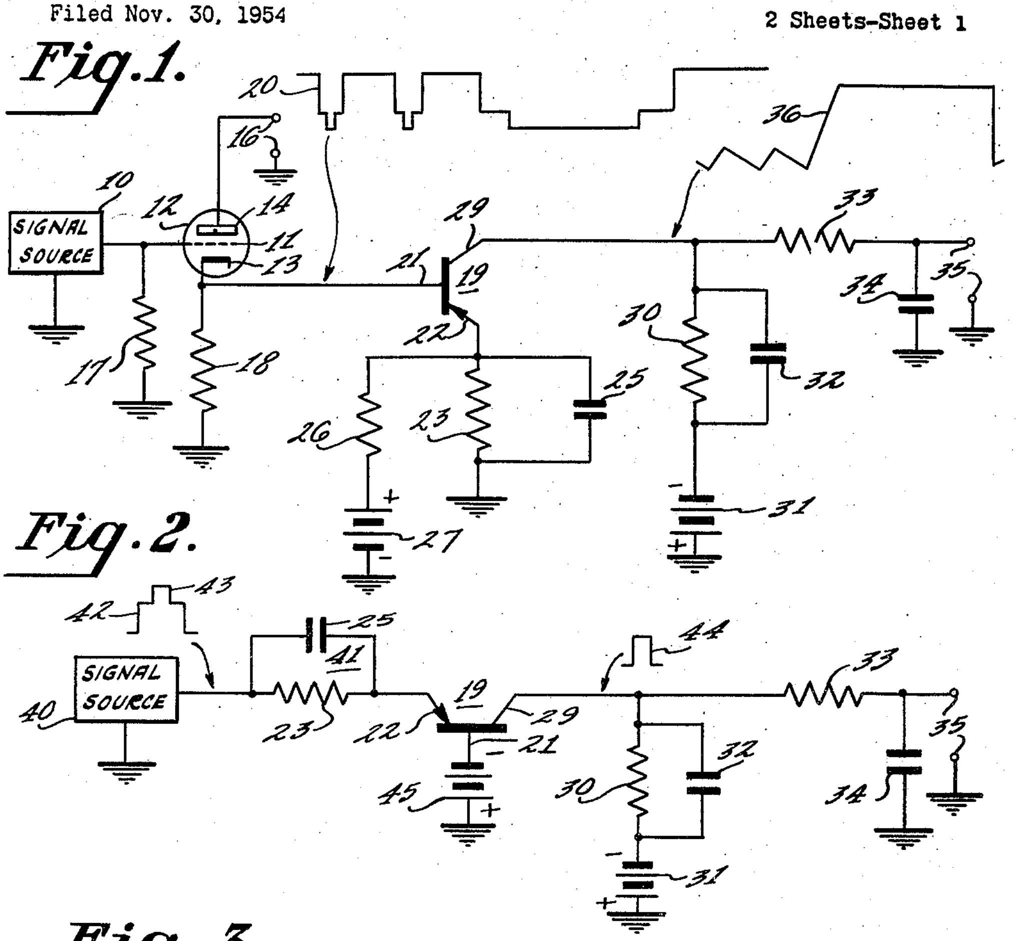

The present invention relates generally to amplitude discriminatory signal translating systems and particularly to signal amplifying systems having an amplifying threshold as well as a limiting level for modifying electrical signals communicated by the system.

In electrical signal processing systems it is frequently required to separate a predetermined amplitude range of signal information from a given alternating current signal. This is generally accomplished by permitting the transmission of signal information having an amplitude in excess of a predetermined threshold by means of a threshold or gate circuit action and by limiting the maximum signal level of the transmitted signal.

Signal processing systems such as television receiving systems generally employ such amplitude discriminatory circuits for the selection of synchronizing information from the composite signal. Such systems, however, are frequently subjected to signals of varying amplitude thus requiring adjustment of the threshold and limiting levels to prevent the transmission of unwanted information. Since the composite signal comprises separate components, it is desirable that the amplitude discriminatory system be responsive to more than one component for automatic level adjustment and yet be effective to provide selective transmission of a single component.

An example of this are the circuits utilized to select vertical synchronizing information, commonly termed the sync separator. Vertical synchronizing information comprises only 20 percent of the synchronizing duty cycle and horizontal synchronizing information comprises the remaining 80 percent of the composite duty cycle. It is therefore desirable to utilize both the vertical and horizontal signal information to establish a threshold level, thereby deriving the benefit of the complete synchronizing duty cycle to more accurately define the threshold with reference to the instantaneous signal level of the input signal. Concomitantly, limiting must be provided to accurately define the maximum excursion of the selected one of the signals in order to avoid the possibility of providing impulse information such as noise having a greater amplitude than the desired information.

It is, accordingly, an object of the present invention to provide an improved signal amplitude discriminatory translating system which is effectively controllable to accommodate signals of varying amplitude.

It is a further object of the present invention to provide an improved semiconductor circuit for selecting a predetermined amplitude range of signal information from a composite signal which may vary appreciably in average amplitude level.

It is another object of the present invention to provide a synchronizing signal separator circuit in which the threshold is established by the composite signal while providing amplification and limiting of only a selected portion of the signal.

It is a still further object of the present invention to provide a vertical synchronization signal separator circuit having a threshold and a limiting level controllable by the level of the input signal to maintain signal translation over a predetermined selected portion of amplitude range.

In accordance with the present invention, a semiconductor signal amplifier device having a time constant circuit in the emitter-base electrode path of the device for deriving a threshold bias is provided in a signal translating system, with a load impedance for establishing saturation for only a preselected portion of the translated signal.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram, partly in block form, of one form of an amplitude discriminatory amplifying system provided in accordance with the present invention; and Figures 2, 3, 4 and 5 are schematic circuit diagrams, partly in block form, of further amplitude discriminatory amplifying systems as provided in accordance with the present invention.

Referring now to the drawings wherein like elements have been designated by the same reference characters throughout the various figures, and referring particularly to Figure 1, a source of signals, which may be the video detector of a television receiving system, is illustrated as a rectangle 10 containing the legend "Signal Source." The signal source 10 is connected between a point of fixed reference potential or signal ground and the control grid 11 of an electron discharge device 12 which further includes a cathode 13 and an anode 14.

The electron discharge device 12 may be the first video amplifier in a television receiving system and, accordingly, the anode circuit may include a load impedance element and a source of energizing potential (not shown) connected between a pair of terminals 16, one of which is connected to the anode 14, the other of which is connected to signal ground. In this manner output signals derived across the load impedance element may be coupled to a subsequent video amplifier for further amplification.

Static bias for the electron discharge device 12 is provided by a grid resistor 17 and a cathode resistor 18 which also serves as the signal source for the amplitude discriminatory system provided in accordance with the present invention.

A semiconductor device, illustrated as a PNP junction transistor 19, is utilized as an amplitude discriminatory device wherein emitter-base current is utilized to establish the lower amplitude extremity or threshold and collector saturation defines the higher amplitude limit of the translated and amplified selected portion of the signal.

The signal which is developed across the cathode resistor 18 is a composite video signal which is represented by the waveform 20 depicting, for the purpose of simplicity, only the blanking pedestals upon which is superimposed the synchronizing information in the form of horizontal synchronizing pulses of short duration and vertical synchronizing pulses of relatively long duration. It is, of course, to be understood that this is a simplified illustration of the synchronizing signals and that a standard television signal will further include equalizing pulses and serrations in the vertical synchronizing pulse in order to maintain horizontal synchronization during this period.

The signal which is developed across the cathode resistor 18 is applied between the base electrode 21 and the emitter electrode 22 of the transistor 19. The amplifying threshold of the transistor 19 is determined by the instantaneous bias existing between the base and emitter electrodes and is determined in part by an RC network comprising a direct current conductive impedance element, illustrated as a resistor 23, connected in shunt with a capacitor 25. A steady state bias condition is provided by means of a limiting resistor 26 and a source of direct current, illustrated as a battery 27, connected in series arrangement between the emitter electrode 22 and signal ground.

Output signals, representing the desired synchronizing information, are derived from the collector electrode 29 by means of a direct current conductive load impedance element, illustrated as a resistor 30, connected in series arrangement with a source of direct current bias, illustrated as a battery 31, between the collector electrode 29 and signal ground. In accordance with the present invention, as will be more fully discussed hereinafter, the signal load for the transistor 19 is provided with a capacitor 32 connected in shunt with the resistor 30 in order to render the load frequency discriminatory. The output signal which may thus be derived from the collector electrode 29 is integrated by the series resistor 33 and the shunt capacitor 34 and may be derived from a pair of output terminals 35, one of which is connected to the junction of the series resistor 33 and the shunt capacitor 34, the other of which is connected directly to signal ground. In an operating television receiving system the output terminals 35 may be connected to the deflection circuits of the system to provide vertical synchronizing information.

It is well known that the composite synchronizing signal comprises horizontal synchronizing pulses or information which represents 80 percent of the composite synchronizing signal and vertical synchronizing pulses or information which represents 20 percent of the synchronizing duty cycle. It is further known that a television receiving system is often subjected to signals of varying amplitude within the system. Proper operation of the system however, requires that a predetermined portion of the signal be selected to provide such functions as synchronization of the deflection circuit. It is, accordingly, desirable to provide an amplifying threshold which is automatically adjusted in accordance with the complete synchronizing duty cycle and at the same time provide selective amplification and amplitude limiting of a selected portion of composite duty cycle such as, the vertical synchronizing pulses.

To insure amplification of the synchronizing pulses of the weakest signal receivable, a small forward emitter-base bias is provided by the battery 27. In some cases such a forward bias might be produced by virtue of the collector to the base leakage current $I_{co}$. However, to make the case general, the forward biasing components comprising the battery 27 and the resistor 26 are shown.

The flow of emitter current through the resistor 23 tends to bias the emitter electrode in the reverse direction with respect to the base electrode. The current component through the resistor 23 due to battery 27 tends to bias the emitter and base electrodes in the forward direction. The long time constant network in the emitter electrode circuit consisting of capacitor 25 and the parallel combination of a pair of resistors 23 and 26 integrates these effects over the duration of one picture frame and, for a constant signal level, maintains a substantially constant emitter voltage. A change in signal level will change the emitter current flow and thus produce a corresponding change in emitter-base electrode bias. Proper proportioning of the voltage source 27 and the resistors 23 and 26 will produce a self-adjusting bias of such a level that emitter to collector current flow occurs only during synchronizing pulses. Under this condition the average emitter current flow will be a function of the signal level and of the composite synchronizing duty cycle.

In order to prevent collector saturation by the horizontal synchronizing pulses the time constant network in the collector electrode circuit is selected to have a time constant which is responsive to the horizontal synchronizing rate and which will, therefore, not provide collector saturation due to horizontal synchronizing pulses but which will charge sufficiently during the longer vertical synchronizing pulses to produce collector saturation and thereby provide amplitude limiting of the vertical synchronizing pulses and of any noise pulses of sufficient duration to interfere with vertical synchronization.

It is known to those skilled in the semiconductor art that when collector saturation is reached, the base-emitter junction takes on the characteristic of a forwardly biased diode preventing further signal amplification. It is also known that under these conditions the change in the base-emitter bias condition will be represented only by a change in the base electrode current which flows in the external circuitry associated with the emitter electrode. It is, therefore, most desirable that collector saturation be avoided in so far as the horizontal synchronizing pulses are concerned in order to more readily establish the amplifying threshold in accordance with the complete synchronizing duty cycle.

This is accomplished by the amplitude discriminatory system provided in accordance with the present invention by virtue of the relatively long time constant of the RC network connected between the base and emitter electrodes of the transistor 19 and the relatively short time constant of the network connected between the collector and emitter electrodes of the transistor 19. An output signal is derived from the collector electrode 29 having a waveform 36 which is seen to contain little horizontal or extraneous information while providing amplitude limited vertical information.

An amplitude discriminatory system of the common base configuration, as provided in accordance with the present invention, is illustrated in Figure 2. The signal source 40, illustrated as a rectangle, connected in series with an RC network 41 between the emitter electrode 22 and signal ground may, in this instance, represent the cathode resistor shown in Figure 1. The RC network 41 comprises the parallel arrangement of a resistor 23 and a capacitor 25 which are selected to provide a relatively long time constant responsive to the vertical synchronizing rate. A static bias for providing an initial amplifying threshold is established by means of a source of direct current bias, illustrated as a battery 45, connected directly between the base electrode 21 and signal ground. The load and output circuits for the transistor 19 are identical with those illustrated in Figure 1.

It is to be noted, however, that in view of the fact that a transistor signal translating circuit of the common base configuration provides no phase reversal between the input and output circuits, the signal source preferably should supply positive going synchronizing information if a positive going synchronizing pulse is ultimately desired. This is illustrated by the waveform 42 which includes a synchronizing pulse 43 imposed upon a positive going blanking pulse and is further illustrated by the positive going synchronizing pulse illustrated as a waveform 44 which is obtained in the collector electrode 29.

The operation of the circuit illustrated in Figure 2 is substantially identical with the operation of the circuit illustrated in Figure 1. Accordingly, the amplifying threshold of the circuit is automatically controlled by the complete synchronizing duty cycle including the horizontal synchronizing information. The output circuit of the transistor 19, however, due to the relatively short time constant provided by the resistor 30 and the capacitor 32, is driven to collector saturation by the vertical synchronizing pulses only. It is readily seen, therefore, that saturation by the vertical synchronizing pulses thereby prevents the existence of impulse noise having an amplitude in excess of the vertical synchronizing pulses from appearing in, and acting upon the vertical deflection circuits.

Figure 3:
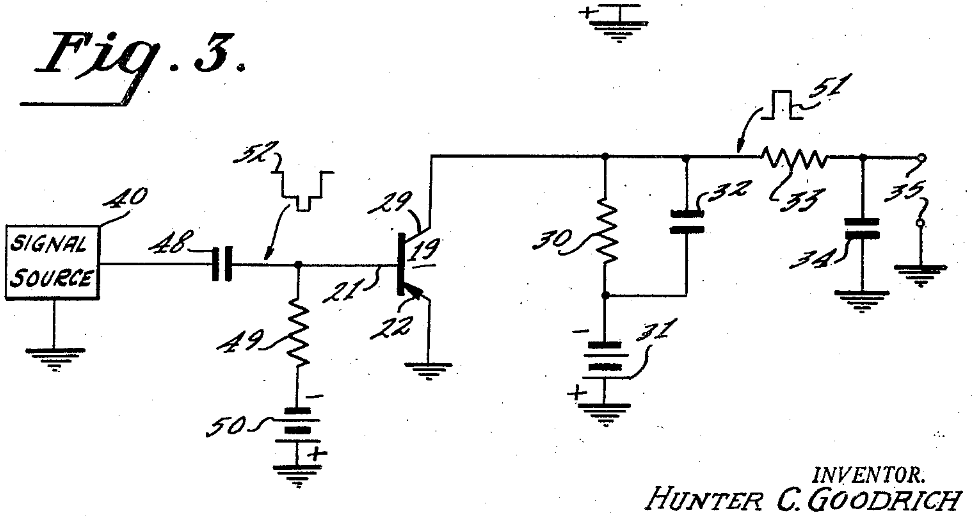

In the schematic circuit diagram illustrated in Figure 3 the transistor 19 is provided in accordance with the present invention in a common emitter configuration wherein the RC network which is selected to have a relatively long time constant is included in the base electrode circuit and comprises a capacitor 48 connected between the signal source 40 and the base electrode 21 and further includes the series arrangement of a resistor 49 and a battery 50 connected between the base electrode 21 and signal ground. The remaining portions of the amplitude discriminatory system are identical with those above discussed in connection with Figures 1 and 2.

It may be readily seen that the time constant provided by the capacitor 48 in combination with the resistor 49, the impedance of the signal source 40 and the very low impedance of the battery 50 will provide the function of establishing an adjustable amplifying threshold in accordance with the synchronizing information. In this embodiment of the present invention however, negative going signal information should be provided at the base electrode 21, as illustrated by the waveform 52, if positive going synchronizing pulses are desired, as illustrated by the waveform 51 which may be derived from the collector electrode 29.

The operation of this embodiment of the present invention is identical with the operation of the embodiments of the inventions above discussed in that the amplifying threshold is automatically adjusted in accordance with the complete synchronizing duty cycle and the output circuit is selected to be responsive for amplitude limiting of only the vertical synchronizing pulses.

Figure 4:
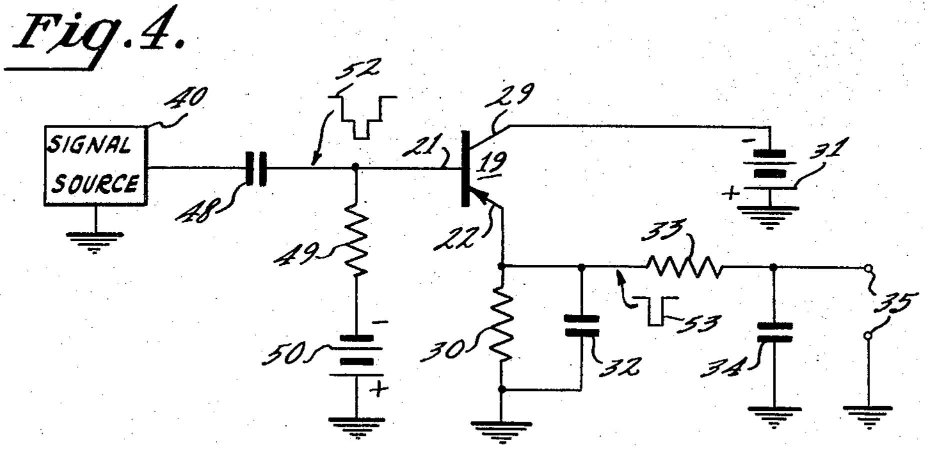

The embodiment of the invention illustrated in Figure 4 utilizes the semiconductor device 19 in a common emitter configuration and in what may be termed an emitter follower arrangement. Accordingly, the RC network, comprising the resistor 30 and the capacitor 32, is connected in the emitter electrode circuit and the RC network, which is selected to provide a relatively long time constant, is connected in the base electrode circuit in the manner above discussed in connection with Figure 3. It is to be noted that, as in Figure 2, this circuit does not provide a phase shift between the input circuit and the output circuit. Accordingly, if a negative going synchronizing pulse is desired as illustrated by the waveform 53 appearing at the emitter electrode 22 a negative going signal as illustrated by the waveform 50 appearing at the base electrode 21 must be provided.

The operation of this circuit in providing an adjustable threshold controlled by the complete synchronizing duty cycle and providing selective amplitude limiting for only the vertical synchronizing pulses is substantially identical with that above discussed. It may be further noted however, that this circuit arrangement does not provide any voltage gain in the translated signal.

Figure 5:
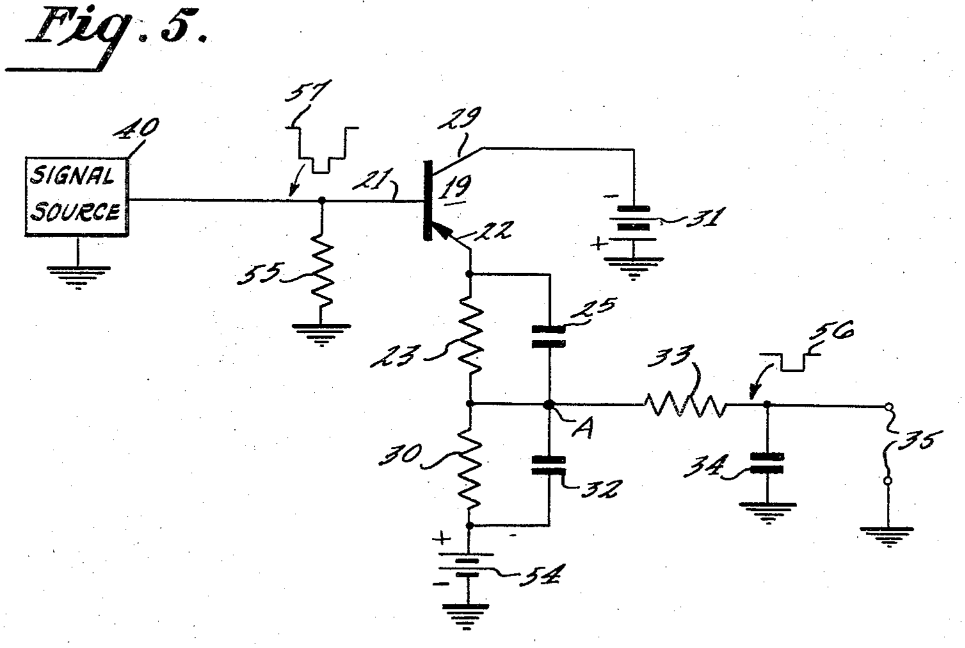

It is also within the scope of the present invention to include both RC networks in series in the emitter electrode circuit of the transistor to be utilized as an amplitude discriminatory device. This is illustrated in Figure 5 wherein the RC network selected to provide the relatively long time constant comprises the shunt arrangement of the resistor 23 and the capacitor 25 which is connected between the emitter electrode 22 and point A which defines the junction of the two RC networks and the point in the circuit from which the output synchronizing pulse may be derived.

The second RC network comprises the parallel arrangement of the resistor 30 and the capacitor 32 connected between the point A and the positive terminal of direct current bias illustrated as a battery 54 the negative terminal of which is connected directly to signal ground. Energizing bias for the collector electrode 29 is provided from a second source of bias current, illustrated as a battery 31, connected between the collector electrode and signal ground.

An input signal for the amplitude discriminatory system may be derived from any convenient source which may be the cathode resistor of the first video amplifier in a television receiving system as illustrated in Figure 1 and which is illustrated as a rectangle 40 connected between the base electrode 21 and signal ground. A direct current path to signal ground is provided for the base electrode by a base resistor 55 which is connected between the base electrode 21 and ground.

An output signal may be derived from this embodiment of the present invention from point A of the system by means of an integrating network comprising the series resistor 23 and the shunt capacitor 34 as above discussed in connection with the previous figures and may be derived across the output terminals 35.

In view of the fact that this arrangement is in the form of an emitter follower circuit as described in connection with Figure 4 there will be no phase reversal between the input and output circuits. Accordingly, if a negative going synchronizing pulse is desired to properly actuate the deflection circuits, as illustrated by the waveform 56, a negative going input signal must be applied to the base electrode 21 as illustrated by the waveform 57.

The operation of the embodiment illustrated in Figure 5 is substantially identical with the operation of the embodiments of the invention previously discussed. Accordingly, the amplifying threshold is automatically controlled and adjusted in accordance with the complete synchronizing signal due to the action of the RC network comprising the resistor 23 and the capacitor 25 and the amplifying limit is provided for only the selected portion of the synchronizing information such as the vertical synchronizing pulses due to the action of the RC network comprising the resistor 30 and the capacitor 32.

The amplitude discriminatory system as provided in accordance with the present invention is therefore seen to provide amplitude selective signal translation of a selected portion of a composite signal while automatically accommodating the threshold level of the system in accordance with a greater portion of the signal than that which is efficiently amplified and limited. This is accomplished with a minimum of circuit elements in an efficient reliable system.

I claim:

1. An amplitude and frequency discriminatory signal amplifying system comprising in combination, a pair of signal input terminals for receiving input signals, a semiconductor amplifying device having base, emitter and collector electrodes, signal coupling means connected between said input terminals and said base and emitter electrodes to define a base-emitter input circuit, bias means connected between said base and emitter electrodes to provide a relatively fixed forward bias therebetween, current responsive means connected in said base-emitter circuit including a time constant network of a value long with respect to a predetermined recurrent rate for developing a reverse bias in said base-emitter circuit which is a direct function of current flow therethrough, and means providing a collector-emitter load circuit including a source of reverse bias and a load resistor connected in series arrangement and a capacitor connected in shunt with said resistor, the resistance of said resistor and the capacitance of said capacitor being of a value to provide a time constant short with respect to said predetermined recurrent rate to produce collector current saturation on input signals of said predetermined recurrent rate having an amplitude in excess of that required to produce emitter-base current.

2. An amplitude and frequency discriminatory system comprising in combination, a source of signal energy having a first periodically recurrent component having one rate of recurrence and a second periodically recurrent component having a higher rate of recurrence and excursions of predetermined polarity and amplitude, a semiconductor device having base, emitter and collector electrodes, signal input circuit means connected between said base and emitter electrodes, output circuit means connected between said collector and emitter electrodes, a first time constant circuit of a value greater than the recurrent rate of said first component serially included in said input circuit means and positioned to develop a reverse emitter-base bias as a direct function of emitter-base current flow, and a source of collector electrode bias and a second time constant network connected in series arrangement in said output circuit means, the time constant of said second time constant circuit being of a value to provide collector saturation in said semi-conductor device for input signal excursions in excess of a predetermined minimum and of said one rate of recurrence.

3. A synchronizing signal clipping system comprising in combination, circuit ground, a source of video signal having blanking and recurring vertical and horizontal synchronizing signal portions of a predetermined polarity, a transistor having base, emitter and collector electrodes, a parallel resistance-capacitance time constant circuit connected between said base and emitter electrodes, the time constant value of said time constant circuit being greater that the recurrence period of said vertical synchronizing portion, signal coupling means connected between said signal source and said base electrode, bias means connected between said base and emitter electrodes of a value which when combined with a time constant circuit terminal voltage prevents emitter-base conduction for signal excursions below the blanking level of applied video signal, a collector circuit reverse bias source having one terminal thereof connected with circuit ground, and a resistance-capacitance network connected between said collector electrode and said collector reverse bias source, the time constant of said network being less than the recurrence period of said vertical synchronizing portion and the value of said resistor being sufficiently high to provide collector current saturation at video signal levels below peak excursions of said vertical synchronizing signal portion.

References Cited in the file of this patent

UNITED STATES PATENTS

| | | |
|---|---|---|
| 2,249,943 | Campbell | July 22, 1941 |
| 2,517,960 | Barney et al. | Aug. 8, 1950 |
| 2,533,001 | Eberhard | Dec. 5, 1950 |
| 2,651,675 | Wissel | Sept. 8, 1953 |